(12) United States Patent
Brower

(10) Patent No.: US 11,783,230 B2
(45) Date of Patent: Oct. 10, 2023

(54) AUTOMATIC GENERATION OF GROUND TRUTH DATA FOR TRAINING OR RETRAINING MACHINE LEARNING MODELS

(71) Applicant: NVIDIA CORPORATION, Santa Clara, CA (US)

(72) Inventor: Eric Todd Brower, Sunnyvale, CA (US)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 17/587,948

(22) Filed: Jan. 28, 2022

(65) Prior Publication Data
US 2022/0156520 A1   May 19, 2022

Related U.S. Application Data

(63) Continuation of application No. 16/521,328, filed on Jul. 24, 2019, now Pat. No. 11,250,296.

(51) Int. Cl.
*G06N 3/04* (2023.01)
*G06N 20/00* (2019.01)
(Continued)

(52) U.S. Cl.
CPC ........... *G06N 20/00* (2019.01); *G06F 18/217* (2023.01); *G06F 18/2148* (2023.01); *G06N 3/04* (2013.01);
(Continued)

(58) Field of Classification Search
CPC ............. G06V 20/52; G06N 3/04; G06N 3/08
See application file for complete search history.

(56) References Cited

U.S. PATENT DOCUMENTS 10,839,198 B2 * 11/2020 Gunji ................... G06V 40/172
2012/0250983 A1 * 10/2012 Meng .................. G06F 18/2178
382/159
(Continued)

FOREIGN PATENT DOCUMENTS

CN    108154118 A    6/2018
CN    108369643 A    8/2018
(Continued)

OTHER PUBLICATIONS

Brower; First Office Action for Chinese Patent Application No. 202010697958.6, filed Jul. 20, 2020, dated Jun. 29, 2023, 13 pgs.

*Primary Examiner* — Sam Bhattacharya
(74) *Attorney, Agent, or Firm* — Taylor English Duma L.L.P.

(57) ABSTRACT

In various examples, object detections of a machine learning model are leveraged to automatically generate new ground truth data for images captured at different perspectives. The machine learning model may generate a prediction of a detected object at the different perspective, and an object tracking algorithm may be used to track the object through other images in a sequence of images where the machine learning model may not have detected the object. New ground truth data may be generated as a result of the object tracking algorithms outputs, and the new ground truth data may be used to retrain or update the machine learning model, train a different machine learning model, or increase the robustness of a ground truth data set that may be used for training machine learning models from various perspectives.

20 Claims, 9 Drawing Sheets

(51) Int. Cl.
  *G06N 3/08* (2023.01)
  *G06F 18/214* (2023.01)
  *G06F 18/21* (2023.01)
  *G06V 10/764* (2022.01)
  *G06V 20/52* (2022.01)
  *G06Q 50/26* (2012.01)

(52) U.S. Cl.
  CPC ............ *G06N 3/08* (2013.01); *G06V 10/764* (2022.01); *G06V 20/52* (2022.01); *G06Q 50/265* (2013.01)

(56) References Cited

U.S. PATENT DOCUMENTS

| | | | |
|---|---|---|---|
| 2014/0093160 | A1 | 4/2014 | Porikli et al. |
| 2018/0012082 | A1* | 1/2018 | Satazoda ................ G06V 20/56 |
| 2018/0357514 | A1 | 12/2018 | Zisimopoulos et al. |
| 2019/0102646 | A1 | 4/2019 | Redmon et al. |
| 2019/0332880 | A1* | 10/2019 | Benge .................. G06V 40/161 |
| 2020/0125845 | A1* | 4/2020 | Hess ........................ G01S 17/89 |
| 2020/0201165 | A1* | 6/2020 | Lock .................... G03B 17/561 |
| 2020/0326276 | A1* | 10/2020 | Viklund .................. H04N 5/33 |
| 2020/0380229 | A1* | 12/2020 | Peruch ................ G06K 7/1443 |

FOREIGN PATENT DOCUMENTS

| | | |
|---|---|---|
| CN | 109564575 A | 4/2019 |
| CN | 109961024 A | 7/2019 |
| KR | 101589149 B1 | 2/2016 |
| WO | 2017133009 A1 | 8/2017 |

* cited by examiner

AUTOMATIC GENERATION OF GROUND TRUTH DATA FOR TRAINING OR RETRAINING MACHINE LEARNING MODELS

CROSS-REFERENCE TO RELATED APPLICATIONS

This application is a continuation of U.S. patent application Ser. No. 16/521,328, filed Jul. 24, 2019, the entire contents of which is hereby incorporated by reference in its entirety.

BACKGROUND

Object detection may be used in any of a variety of technology areas such as security and surveillance (e.g., face detection or face recognition), autonomous machine applications (e.g., identifying vehicles, pedestrians, road signs, traffic lights, and other objects in the environment), optical character recognition (e.g., identifying license plates for text recognition), object tracking (e.g., for traffic monitoring, robotic vision applications, or animation), activity recognition (e.g., gate recognition), medical imaging, and many others. Conventional object detection systems use machine learning and/or computer vision to identify, detect, and/or track objects within images, but are often limited to doing so only from a certain perspective. When an object detection algorithm or machine learning model is trained or programmed to identify objects from this certain perspective, the algorithm or model may be ineffective, inaccurate, and/or unable to perform when presented with images captured from a different perspective. This may be, for example, because the same object may look different from different perspectives (e.g., a top of a vehicle looks different from a rear of a vehicle), which may result in missed detections of an object or false positives.

With respect to computer vision techniques, for example, conventional computer vision algorithms are specifically programmed to identify defined objects from a defined perspective. When these conventional computer vision techniques are employed on images captured from a different perspective, the computer vision technique would need to be re-programmed in order to work on the images. Similarly, where machine learning models (e.g., deep neural networks (DNNs), such as convolutional neural networks (CNNs)) are used for object detection, the machine learning models need to be trained on images captured from a certain perspective (e.g., vantage point, viewing angle, field of view, etc.) in order to make high-confidence object detections once deployed. For example, a machine learning model trained on image data generated from a forward-facing camera mounted at dashboard height of a vehicle may not detect objects accurately—e.g., across a sequence of video frames—when image data generated from a traffic camera mounted at the top of a traffic signal is applied.

To remedy these deficiencies, conventional systems have required that the machine learning model be trained using new image data captured by, or from the perspective of, the camera that is deployed with the machine learning model. However, to train the machine learning model on the new image data, these conventional systems also require the generation of new ground truth data using a brute force approach (e.g., manually labeling each new image) to accurately train the machine learning model with respect to the new perspective. This process of ground truth generation and retraining requires significant effort, time, and resources (e.g., human annotators may be required to label bounding boxes for each object in each image, compute resources are heavily used to retrain the machine learning model, etc.). In addition, because the accuracy of these conventional systems is limited to the perspectives used to train the machine learning models, these systems are not easily scalable.

SUMMARY

Embodiments of the present disclosure relate to automatic generation of ground truth data for training or retraining machine learning models. More specifically, systems and methods are disclosed that leverage object detections made by machine learning models to automatically generate new ground truth data for training or retraining the machine learning model or another machine learning model for accurate detection and identification of objects from a variety of perspectives.

In contrast to conventional systems, such as those described above, the current system may use outputs from one or more existing machine learning models to generate additional ground truth data to train or retrain the machine learning model or another machine learning model to detect objects from multiple perspectives. As such, the current system may leverage an existing machine learning model to automatically generate new ground truth data—e.g., using an object tracking algorithm—without requiring manual labeling. According to embodiments, outputs of an existing machine learning model trained on image data from a first perspective may be used to generate new ground truth data for image data generated from a second perspective. For example, when a machine learning model trained on images from a first set of images captured at a first perspective detects an object from an image from a second set of images captured at a second perspective, but did not detect the object in others of the second set of images, an object tracking algorithm may be used to track the object in, and generate new ground truth data for, the other images of the second set of images.

As a result of automatically generating ground truth according to the processes of the present disclosure, new ground truth data for detecting objects from new perspectives may be efficiently and accurately generated without requiring the time expense or compute resources of brute force manual ground truth generation of conventional systems. In some embodiments, the automatic ground truth data may be generated while a machine learning model is in deployment (e.g., at the edge), allowing the system to be trained in real-time. Additionally, because the system of the present disclosure leverages an existing machine learning model, the ground truth data may be selectively generated specifically for perspectives or objects at which the existing model is ineffective at detecting accurately. In this manner, the computational power is allocated conservatively and efficiently to only generate ground truth data where gaps need to be filled (e.g., without generating ground truths for every image and/or situation possible)—thereby requiring less processing power, energy consumption, and time allocation as compared to conventional approaches.

BRIEF DESCRIPTION OF THE DRAWINGS

The present systems and methods for automatic generation of ground truth data for training or retraining machine learning models are described in detail below with reference to the attached drawing figures, wherein.

DETAILED DESCRIPTION

Figure 1A:
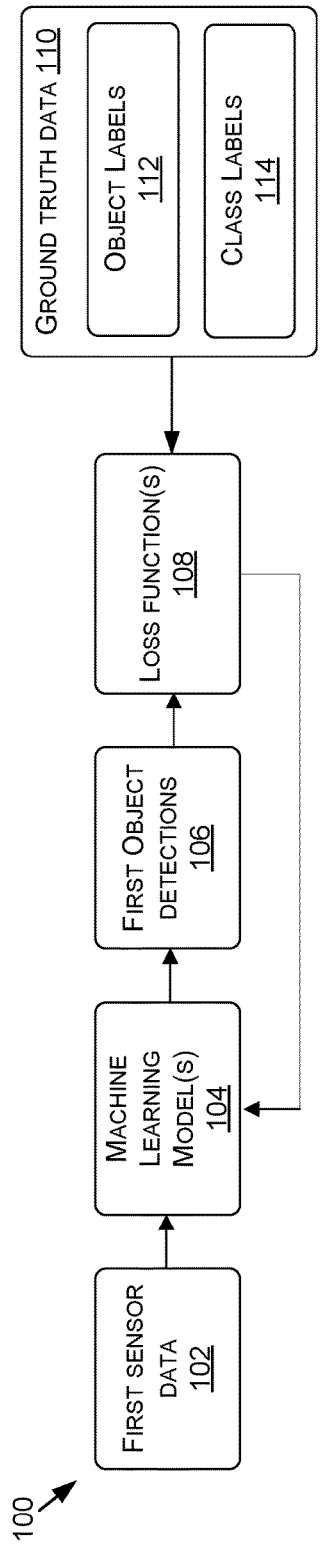
FIG. 1A is a data flow diagram illustrating an example process for training a machine learning model to detect objects in sensor data generated by a sensor at a first perspective, in accordance with some embodiments of the present disclosure.

Systems and methods are disclosed related to automatic generation of ground truth data for training or retraining machine learning models. The systems and methods described herein may be used in augmented reality, virtual reality, robotics, security and surveillance, character recognition, medical imaging, autonomous machine applications, and/or any other technology spaces where object detection may be implemented. In addition, although the detections described herein relate primarily to objects such as vehicles, pedestrians, road signs, traffic lights, baggage, and/or the like, the present disclosure is not intended to be limited to only these detections. For examples, the processes described herein may be used for detecting any objects or features, such as, without limitation, signs, poles, animals, trees, characters, letters, items, products, barriers, activities, digital watermarks, and/or anatomical objects.

As described above, and in contrast to the conventional systems, the current system provides accurate, automatic, and efficient approaches to generating new ground truth data for training or retraining (e.g., updating) machine learning models. For example, outputs of a machine learning model (e.g., a deep neural network (DNN)) trained on image data from a first perspective may be used to generate new ground truth data for image data generated from a second perspective. For example, when a DNN trained on a first set of images from a first perspective detects an object from an image from a second set of images captured at a second perspective, an object tracking algorithm may then be used to track the object in the other images of the second set of images (e.g., images where the object was not detected by the machine learning model). Based on the tracking of the object in the other images, ground truth labels may be automatically generated for the object in the other images by leveraging the labeled object detected in the image from the second set of images. In this manner, the current system may use an existing machine learning model—in conjunction with an object tracking algorithm, in embodiments—to retrain itself, or to generate the new ground truth for training another machine learning model for use at the second perspective. As such, a larger data set may be used to train a machine learning model, or multiple machine learning models, by leveraging an already trained machine learning model. Additionally, since the current system leverages an existing machine learning model, the ground truth data may be selectively generated for where the existing machine learning model is ineffective at accurately detecting objects (e.g., images where the machine learning model did not detect the object), thereby filling in the gaps in the detection of objects by the machine learning model.

In some examples, in addition to being trained to detect objects (and output bounding boxes), the machine learning model may be trained to predict an object class (e.g., car, truck, make, model, pedestrian, animal, dog, cat, etc.). As a result, once the object is detected in at least one of the images from the second perspective (e.g., the perspective that the machine learning model was not trained for), the object class may be carried through (e.g., propagated) and associated with each of the bounding labels for the object in the other images (e.g., the images that the machine learning model did not detect the object). As a result, not only is object classification ground truth data automatically generated, the classification is learned by the machine learning model for the object from different perspectives. In some examples, this method may be used to train a machine learning model to detect and classify an object from any of a number of different perspectives (e.g., while only requiring manual ground truth data for object detection and classification from a single perspective). As a result, the system of the present disclosure saves substantial manual effort as well as reduces the overall time and resource requirements (e.g., compute resources for manual labeling programs) in generating new ground truth data for training, or retraining, machine learning models to accurately detect and/or classify objects in images generated from any of a number of different perspectives.

Now referring to FIG. 1A, FIG. 1A is a data flow diagram illustrating an example process 100 for training a machine learning model to detect objects in sensor data generated by a sensor at a first perspective, in accordance with some embodiments of the present disclosure. The process 100 may be used for training any type of machine learning model(s)

104, such as but not limited to those described herein. While the object types described with respect to FIG. 1A are cars and pedestrians, this is not intended to be limiting, and is used for example purposes only. For example, the object types may further include, road signs, traffic lights, baggage, etc. At a high level, the process 100 may include one or more machine learning model(s) 104 receiving one or more inputs, such as first sensor data 102, and generating one or more outputs, such as one or more first object detections 106. In some examples, when used for training, the first sensor data 102 may be referred to as training data. Although the first sensor data 102 is primarily discussed with respect to image data representative of images, this is not intended to be limiting, and the first sensor data 102 may include other types of sensor data used for object detections, such as LIDAR data, SONAR data, RADAR data, and/or the like.

The first sensor data 102 may be used for training a machine learning model(s) 104 to detect objects. The first sensor data may include image data generated by and/or received from one or more sensors (e.g., image sensors) capturing images at a first perspective (e.g., vantage point, viewing angle, field of view, etc.). Although the first perspective may be any perspective, for example purposes herein, the first sensor data 102 may be sensor data generated from a forward-facing sensor (e.g., image sensor of a camera) disposed, mounted, or positioned on a vehicle. In such examples, first sensor data 102 may include sensor data from any of the sensors of the vehicle (e.g., vehicle 210 of FIG. 2B-2C).

Where the sensor is an image sensor(s) of a camera(s), the camera(s) may include a wide-view camera, a surround camera, a stereo camera, and/or a long-range or mid-range camera. Each camera may include a field of view (e.g., the field of view of the forward-facing stereo camera and/or the wide-view camera) and, in some examples, more than one camera or other sensor (e.g., LIDAR sensor, RADAR sensor, etc.) may be used to incorporate multiple fields of view (e.g., the fields of view of the long-range cameras, the forward-facing stereo camera, and/or the forward facing wide-view, etc.).

In any example, the first sensor data 102 may include image data representing an image(s), image data representing frames of a video, and/or sensor data representing fields of view—or sensory fields—of sensors (e.g., LIDAR sensor(s) 864, RADAR sensor(s) 860, etc.). In some examples, the first sensor data 102 may be input into the machine learning model(s) 104 and used by the machine learning model(s) 104 to compute first object detections 106. In some other examples, the first sensor data 102 may be provided as input to a sensor data pre-processor to generate pre-processed first sensor data. The pre-processed first sensor data may then be input into the machine learning model(s) 104 as input data. As such, the first sensor data 102, as used herein, may include the pre-processed first sensor data and/or the first sensor data 102 without any pre-processing.

Many types of images or formats may be used as inputs, for example, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear Clear Clear (RCCC) or other type of imaging sensor. It is noted that different formats and/or resolutions could be used training the machine learning model(s) 104 than for inference (e.g., during deployment of the machine learning model(s) 104 after trained).

The first sensor data 102 used for training may include original images (e.g., as captured by one or more image sensors), down-sampled images, up-sampled images, cropped or region of interest (ROI) images, otherwise augmented images, and/or a combination thereof. The machine learning model(s) 104 may be trained using the images (and/or other first sensor data 102) as well as corresponding ground truth data 110. The ground truth data 110 may include annotations, labels, masks, and/or the like. For example, in some embodiments, the ground truth data 110 may include object label(s) 112, and/or class label(s) 114 (e.g., encoded to correspond to one or more of the objects and corresponding classes). The ground truth data 110 may be generated within a drawing program (e.g., an annotation program), a computer aided design (CAD) program, a labeling program, another type of program suitable for generating the ground truth data 110, and/or may be hand drawn, in some examples. In any example, the ground truth data 110 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies center or origin point and dimensions of bounding shape, machine generates bounding shape). In some examples, for each iteration of the first sensor data 102 (e.g., for each image), there may be corresponding ground truth data 110.

The object label(s) 112 may include annotations, or other label types (e.g., bounding box), corresponding to objects (e.g., vehicles, pedestrians, street signs, etc.). The object label(s) 112 may be generated for each of the images (or other sensor data representations, such as a LIDAR map) and for one or more objects within each of the images of the first sensor data 102 used for training the machine learning model(s) 104. The number of object labels may correspond to the number of objects that the machine learning model(s) 104 is trained to predict, or to the number of objects in the respective image. Depending on the embodiment, the object label(s) 112 may correspond to a bounding shape (e.g., a bounding box, polygon, circle, etc.) around at least a portion of a vehicle, a pedestrian, a street sign, a sidewalk, a road sign, a traffic light, baggage, and/or any other object depending on the embodiment. The bounding shape may be referred to as a bounding label, herein, without departing from the scope of the present disclosure.

The class label(s) 114 may include annotations, tags, or other label types, corresponding to object classes (e.g., car, human, stop sign, yield sign, etc.) and associated with the object label(s) 112. The class label(s) 114 may be generated for each of the images (or other data representations) and/or for one or more of the objects in the images represented by the first sensor data 102 used for training the machine learning model(s) 104. The number of class labels may correspond to the number and/or type of objects that the machine learning model(s) 104 is trained to predict, or to the number of objects and/or type of objects in the respective image. Depending on the embodiment, the class label(s) 114 may correspond to a class labels or tags corresponding to a type of object, such as but not limited to, a car, a human, an animal, a stop sign, a yield sign, a crosswalk, etc.

A loss function(s) 108 may be used to further train the machine learning model(s) 104 to detect objects in first sensor data 102. For the first object detections 106 output by the machine learning model(s) 104, a loss function(s) 108 may be used to update parameters (e.g., weights and biases) of the machine learning model(s) 104 in view of the ground truth data 110. As such, the machine learning model(s) 104 may be trained to accurately predict the first object detections 106 (and/or associated class labels) from the first sensor data 102 using the loss function(s) 108 and the ground truth data 110.

The machine learning model(s) 104 may use the first sensor data 102 to compute the first object detections 106. Although examples are described herein with respect to using deep neural networks (DNNs), and specifically convolutional neural networks (CNNs), as the machine learning model(s) 104 (e.g., with respect to FIGS. 1B-1C), this is not intended to be limiting. For example, and without limitation, the machine learning model(s) 104 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), object detection algorithms, computer vision algorithms, and/or other types of machine learning models.

The first object detections 106 may include object detections and/or corresponding object class detections. The object detections may be representative of the objects detected within the image(s) represented by the first sensor data 102. The object detections may include detections of various objects, including but not limited to, vehicles, pedestrians, street signs, roadblocks, and/or any other type of object depending on the embodiment (e.g., depending on the object types the machine learning model(s) 104 is trained to detect). The object class detections may be representative of the class labels 114 of each object detected. The object class detections may include various classes, such as, cars, humans, animals, stop signs, yield signs, roadblocks, etc.

As such, the machine learning model(s) 104, after the process 100, may be trained—e.g., ready for deployment—to predict the first object detections 106 and/or associated class labels using the first sensor data 102 captured from the first perspective.

Figure 1B:
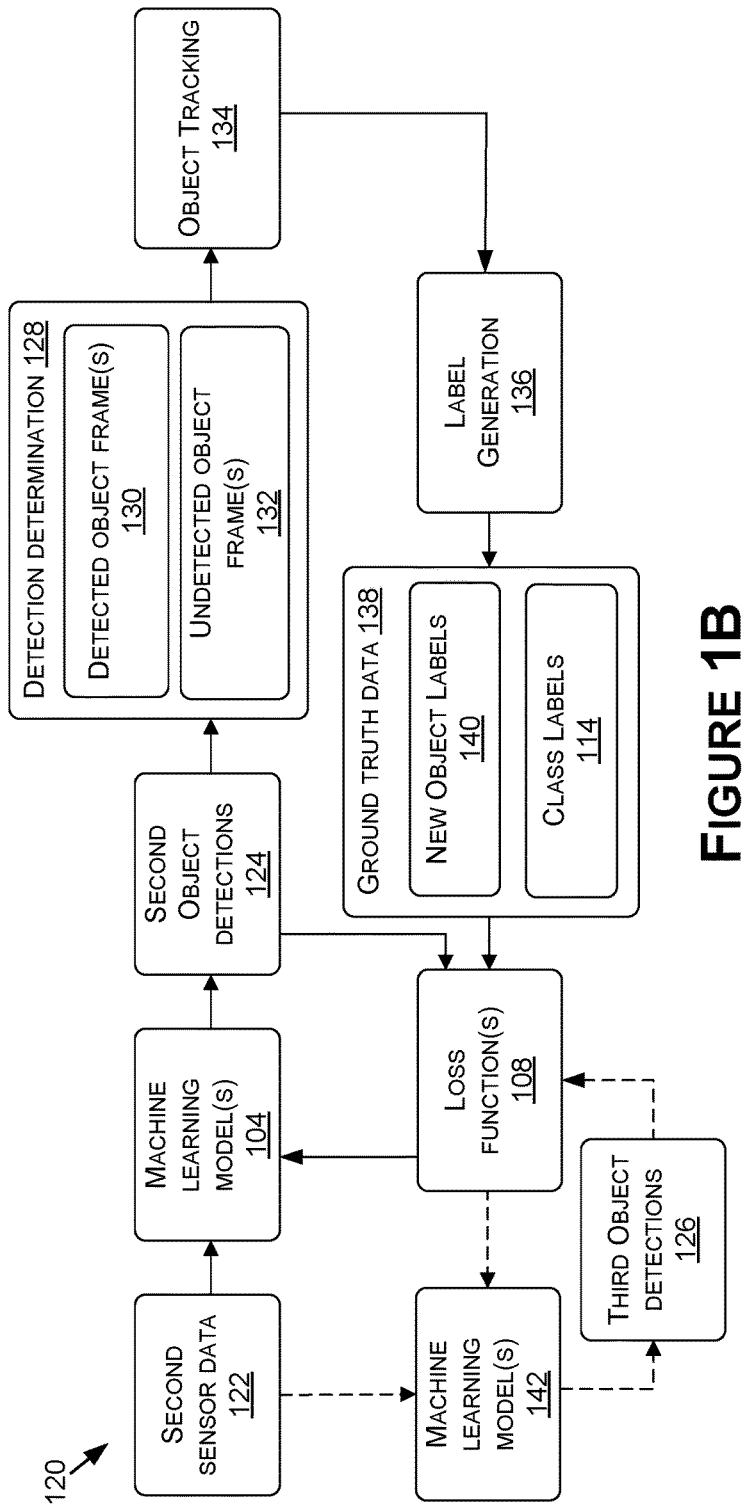
FIG. 1B is data flow diagram illustrating an example process for automatically generating ground truth data using a machine leaning model trained from image data at a first perspective to detect objects in image data from a second perspective, in accordance with some embodiments of the present disclosure.

Now referring to FIG. 1B, FIG. 1B is a data flow diagram illustrating an example process 120 for using a machine learning model trained to detect objects at a first perspective to automatically generating ground truth data to detect objects at a second perspective, in accordance with some embodiments of the present disclosure. While the object types described with respect to FIG. 1B are cars and pedestrians, this is not intended to be limiting, and is used for example purposes only.

Second sensor data 122 may be image data, or another data type, generated by one or more sensors similar to those detailed above with respect to the first sensor data 102. However, the second sensor data 122 may be generated by a sensor (e.g., a same type of sensor that captured the first sensor data 102) at different perspective (e.g., having a different field of view, or sensory field) than the sensor that captured the first sensor data 102. For a non-limiting example, if first sensor data 102 is generated and/or received from a camera disposed or positioned on a car, the second sensor data 122 may be generated and/or received from a camera located at a relatively higher angle, such as a traffic camera or a camera disposed or positioned on a building. Although the second perspective may be any perspective that is different from the first perspective, for example purposes herein, the second sensor data 122 may be sensor data generated by a traffic camera disposed or positioned above a roadway (e.g., on an overpass, on a pole, on a building, on a streetlight support, etc.).

The examples of camera locations and perspectives described herein are for illustrative purposes only, and are not intended to be limiting. As such, other camera locations and perspectives may be used instead with similar accuracy and efficiency. For a non-limiting example, the first perspective may be from a bag level at a baggage carousel, and the second perspective may be from a ceiling mounted camera with a view of the same baggage carousel. As another non-limiting example, the first perspective may be from an eye-level at an entrance gate to an event space, and the second perspective may be from an overhead view of the entrance gate. In addition, although the first perspective and the second perspective as described as such, these perspectives may be reversed without departing from the scope of the present disclosure (e.g., the first perspective may be from a traffic camera and the second perspective may be from a vehicle).

The second sensor data 122 may be applied to the machine learning model(s) 104 (e.g., that has been trained to detect objects and/or classes of objects using the first sensor data 102). As described herein, because the machine learning model(s) 104 may be trained to detect objects using the first sensor data 102 captured from a first perspective, the machine learning model(s) 104, when receiving the second sensor data 122 as an input, may not generate as accurate of results (e.g., second object detections 124) as when receiving the first sensor data 102. This may be because objects may not appear similarly at the first perspective as opposed to the second perspective. For example, with respect to FIG. 3A, vehicle 310 may appear differently in image 302 as compared to image 306. For example, assuming the machine learning model(s) 104 was trained to detect vehicles at the perspective of a camera of a vehicle (e.g., a dash cam), the machine learning model(s) 104 may not detect the vehicle 310 in image 302 (e.g., because the image 302 includes the vehicle 310 at a top-down angle), but may detect the vehicle 310 in image 306 (e.g., because the vehicle is at more of a rear-view, similar to that of a forward-facing camera disposed or positioned on a vehicle)—as illustrated by bounding shape 312C in the image 306.

As such, when predicting the second object detections 124, the machine learning model(s) 104 may not detect the object in every frame. However, the detection determination 128 may be used to determine which of the frames or images the object was detected (e.g., detected object frame(s) 130) and which of the frames or images the object was not detected (e.g., undetected object frame(s) 132). The detected object frame(s) 130—or more specifically the object detection information (e.g., the object locations and/or classes) from the second object detections 124—may be leveraged to generate new ground truth data 138 for the undetected object frame(s) 132 in order to train a machine learning model(s) 142 and/or retrain the machine learning model(s) 104 to detect objects at the second perspective.

For example, one or more of the second object detections 124 from the detected object frame(s) 130 may be used to perform object tracking 134 (e.g., using an object tracking algorithm). The object tracking algorithm used for the object tracking 134 may include any type of object tracking algorithm—without limitation. The object tracking algorithm may associate objects from one frame (e.g., where detected, such as in the detected object frames 130) with objects in other frames (e.g., where an object has not been or is not yet detected, such as in the undetected object frames 132). The object tracking algorithm, without limitation, may use a target representation and localization algorithm, a kerned-based tracking algorithm, a mean-shift tracking algorithm, a contour tracking algorithm, a filtering and data association algorithm, a Kalman filter based algorithm, a particle filter based algorithm, and/or any other approach or algorithm for object tracking.

In some examples, the object tracking 134 may be performed from a detected object frame 130 (e.g., using the bounding shape of the detected object) to track the object forwards and/or backwards—in sequence—to identify a location of the object in one or more of the undetected object frames 132. For example, with respect to FIG. 3A, assume that the image 302 is captured first, then the image 304, then the image 306, in sequence (where each of the images 302, 304, and 306 are represented by the second sensor data 122). In such an example, and because the machine learning model(s) 104 may be trained to detect objects at the first perspective of the first sensor data 102, only the image 306 may be included in the detected object frames 130 and the images 302 and 304 may be included in the undetected object frames 132. As such, the detections (e.g., represented by the bounding shapes 312C and 314C of the vehicle 310C and the pedestrian 320C, respectively) may be used to perform object tracking 134, in reverse order (e.g., from the image 306, to the image 304, and then to the image 302), to generate new object labels 140 through label generation 136 for the vehicle 310 and the pedestrian 320 in each of the images 302 and 304 (e.g., as illustrated in FIG. 3B). The object labels generated based on the predictions of the second object detections 124 by the machine learning model(s) 104 may be carried over to the object detected within the undetected object frame(s) 132 predicted to have included the object. In some non-limiting examples, the size or dimensions of the object label (e.g., for the new object labels 140) for the detected object may be adjusted during label generation 136 for each image and/or frame based on the size of the object within the frame (e.g., the size of the new object labels 140 may be decreased as the relative scale of the object decreases, or increased as the relative scale of the object increases). In other non-limiting examples, the size or dimensions of the object labels predicted in the second object predictions 124 may be used without adjustment for the new object labels 140. In addition, and again with respect to FIC. 3B, because the class labels 114 may already be associated with the vehicle 310C and the pedestrian 320C in the image 306, the class labels 114 may be carried through as ground truth during the label generation 136 for the images 302 and 304.

Although the above example is described with respect to a reverse order for the object tracking 134 (e.g., tracking the objects from the image 306 backwards toward the image 302), this is not intended to be limiting. In some examples, the machine learning model(s) 104 may have detected the vehicle 310 and/or the pedestrian 320 at an earlier image (e.g., the image 302), at a middle image (e.g., the image 304), and/or another image in the sequence of images, and object tracking 134 may be used to track the vehicle 310 and/or the pedestrian 320—e.g., in sequential or semi-sequential (e.g., every other image, every third image, etc.) order—in a forward and/or a reverse direction. As such, the images, or sequence of images, may be re-ordered in any way that allows that an object tracking algorithm to track an object from an image where the object was detected through other images in the sequence. In addition, although only three images are illustrated, this is not intended to be limiting, and any number of images may be included in a sequence of images.

The ground truth data 138—including the new object labels 140 and the class labels 114 associated therewith—may be used to train a machine learning model(s) 142 and/or retrain or update (e.g., at the edge, in deployment) the machine learning model(s) 104 (e.g., using the loss function(s) 108). In some examples, the ground truth data 110 (e.g., a first set of ground truth data) may be used in addition with the ground truth data 138 (e.g., a second set of ground truth data) to form a master set of ground truth data for training a machine learning model(s) 142 and/or 104 to detect object from multiple perspectives. Where the machine learning model(s) 142 is trained using the ground truth data 138 (and/or the ground truth data 110), the second sensor data 122 may be applied to the machine learning model(s) 142, the machine learning model(s) 142 may compute third object detection(s) 126, and the loss function(s) 108 and the ground truth data 138 may be used to update and optimize the parameters of the machine learning model(s) 142. Where the machine learning model(s) 104 is retrained or updated using the ground truth data 138, the second sensor data 122 may be applied to the machine learning model(s) 104, the machine learning model(s) 104 may compute the second object detection(s) 124, and the loss function(s) 108 and the ground truth data 138 may be used to update and optimize the parameters of the machine learning model(s) 104. In some examples, such as where retraining is done at the edge (e.g., after deployment of the machine learning model), only the new object labels 140 and class labels 114 associated with the undetected object frame(s) 132 from the second sensor data 122 may be used as the ground truth data 138. As such, the machine learning model(s) 104 may be retrained or updated only using images or frames in which false negatives were previously predicted. As a result, the amount of processing and compute power to generate the new ground truth data for retraining the machine learning model(s) 104 may be reduced because only a subset of the second sensor data 122 needs to be used for training. In addition, using this process, the machine learning model(s) 104 may be able to detect objects in images generated from multiple perspectives (e.g., the first perspective of the first sensor data 102 the machine learning model(s) 104 was originally trained on, and the second perspective of the second sensor data 122) without having to generate—e.g., manually, in conventional approaches—a new set of ground truth data that includes both the ground truth data 110 and the ground truth data 138 and train the machine learning model(s) 104 using all of the ground truth data.

As described herein, in some embodiments, the machine learning model(s) 104 may be retrained or updated using the ground truth data 138 on the edge. In such examples, the automatically generated new ground truth data 138 may be used to retrain or update the machine leaning model(s) 104 while the machine learning model(s) 104 is deployed—e.g., in real-time. As such, the machine learning model(s) 104 may be retrained, and learn to detect objects from a new perspective, without requiring generating and training an entirely new model in a training system and/or without requiring removing the machine learning model(s) 104 from deployment to update or retrain in the training system. This process of training or updating the machine learning model(s) 104 may happen continuously, periodically, at an interval, and/or based on any other criteria. For example, when a threshold amount of images (or other data representations) are determined—using the detection determination 128—to be undetected object frames 132, the machine learning model(s) 104 may undergo retraining or updating within the process 120 to improve the accuracy, robustness, and efficacy of the machine learning model(s) 104.

As used herein, retraining at the edge may refer to retraining on the device, or within a system, that the machine learning model(s) 104 is deployed on or in. For example, a developer may train the machine learning model(s) 104 in the training system (e.g., using a server-based model training system), and then deploy the machine learning model(s) 104 in a product. The end-user of the product may then use the product—that includes the deployed machine learning model(s) 104 trained on the first sensor data and the first ground truth data 110—to perform the function of the product. However, because the implementation by the end-user may include the second sensor data 122 captured at the second perspective, the machine learning model(s) 104 produce undetected object frames 132. As such, instead of the developer updating the machine learning model(s) 104 using the model training system, the machine learning model(s) 104 may be updated within the system of the end-user that is deploying the machine learning model(s) 104. This process creates a more seamless update and retraining method for the end-user, without an extended delay in use of the product as a result of relying on the developer to update or retrain the machine learning model(s) 104.

In some examples, the process 120 may be used to produce larger, more robust ground truth data sets. For example, when the machine learning model(s) 104 is trained from the first perspective of the first sensor data 102, the process 120 may be used to generate the ground truth data 138 from the second perspective of the second sensor data 122. This may increase the size or robustness of the ground truth data set that may be used to train the machine learning model(s) 142 and/or other machine learning models to detect objects from any of a variety of different perspectives, without requiring manual labeling of the entire ground truth set. Although the second sensor data 122 from the second perspective is illustrated in FIG. 1B, this is not intended to be limiting. For example, sensor data from any number of different perspectives (e.g., third sensor data from a third perspective, fourth sensor data from a fourth perspective, and so on) may be used within the process 120 to automatically generate new ground truth data for increasing the robustness of the ground truth data set that may be used to train the machine learning model(s) 142 and/or retrain or update (e.g., on the edge, in some embodiments) the machine learning model(s) 104.

In other examples, the process 120 may be used within a quality assurance (QA), or quality control (QC) system. For example, once the machine learning model(s) 104 are trained at the first perspective, the QA or QC system may use detection determination 128 to determine the quality or accuracy of the machine learning model(s) 104 at predicting the second object detections 124. Once false negative are identified (e.g., in the undetected object frames 132), the ground truth data 138 associated with the false negatives may be used retrain the machine learning model(s) 104—e.g., using the loss function(s) 108—to account for the false negatives. This QA or QC process may be performed at the model training system (e.g., apply the second sensor data 122 after training to test accuracy), on the edge (e.g., test the accuracy during deployment), or a combination thereof. In any example, once the accuracy falls below a threshold, the machine learning model(s) 104 may be retrained or updated at the model training system, on the edge, or a combination thereof.

In some examples, to determine a false negative detection, object detection data from the machine learning model(s) 104 may be used to determine the detected object frame(s) 130. In addition, undetected object frame(s) 132 may be determined from the object detection data. The presence of the object in the detected object frame(s) 130 may be used by an object tracking algorithm (e.g., during object tracking 134) to identify whether the object is present in any of the undetected object frame(s) 132. This may include tracking the object from the detected object frame(s) 130 in a forward order, reverse order, or another order to determine the undetected object frame(s) 132 where the object was actually present (e.g., a false negative detection). Once one or more false negative detections are determined (e.g., above a threshold amount, or percentage) a message may be generated to indicate the false negative detections and that there may be a QA or QC issue. In response, the tracking information may be used to generate new ground truth data for the undetected object frame(s) 132 for retraining the machine learning model(s) 104 and/or for training another machine learning model(s) 142.

Figure 1C:
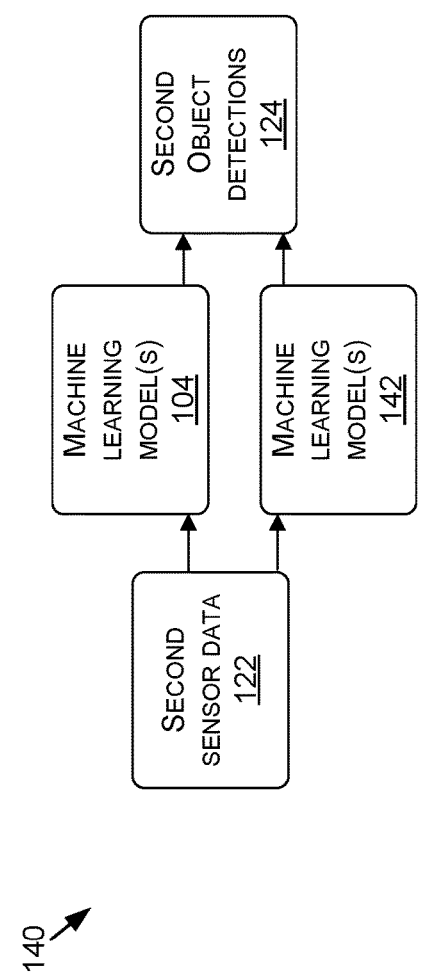
FIG. 1C is data flow diagram illustrating an example process for deploying trained machine learning models to detect objects in sensor data, in accordance with some embodiments of the present disclosure.

Referring now to FIG. 1C, FIG. 1C is a data flow diagram illustrating an example process 140 for deploying trained machine learning models to detect objects in sensor data, in accordance with some embodiments of the present disclosure. For example, once the machine learning model(s) 104 and/or the machine learning model(s) 142 are trained or retrained (e.g., according to the process 120 described in FIG. 1B) and deployed, the second sensor data 122 (e.g., sensor data captured from the second perspective) may be applied as input to the machine learning model(s) 104 and/or the machine learning model(s) 142. The machine learning model(s) 104 and/or the machine learning model(s) 142 may then generate the second object detections 124, where the second object detections 124 may include object detections in a greater number or proportion of the frames (e.g., there will be less, or no, undetected object frames 132).

Figure 2A:
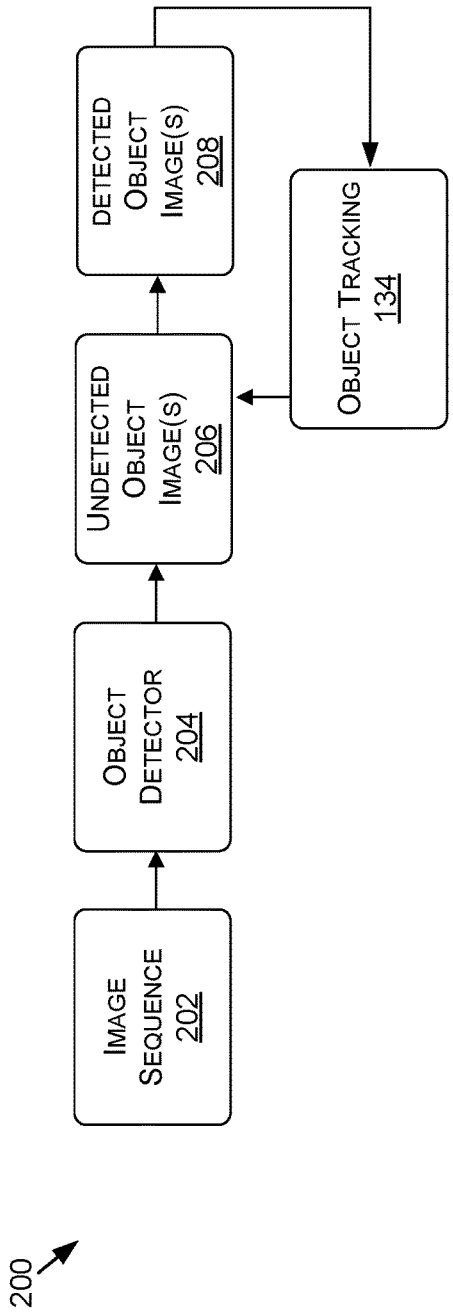
FIG. 2A is data flow diagram illustrating an example process for automatically detecting objects in a set of preceding images in an image sequence, in accordance with some embodiments of the present disclosure.

Now referring to FIG. 2A, FIG. 2A is a data flow diagram illustrating an example process 200 for automatically detecting objects in a set of images in an image sequence, in accordance with some embodiments of the present disclosure. The process 200 may be executed using a sequence of images applied to an object detector 204. The object detector 204 may be any object detection algorithm, machine learning model (e.g., the machine learning model(s) 104 of FIGS. 1A-1C), etc., that is capable of detecting objects at least in sensor data (e.g., images) generated from sensors (e.g., image sensors of cameras) located at a first perspective (e.g., field of view). As such, the object detector 204 may be used to detect an object in one or more images in an image sequence 202 generated from a second, different perspective than the first perspective that the object detector is programmed or trained on.

In a non-limiting example, the object detector 204 may generate predictions for each of the images in the image sequence 202, one after the other, in forward or reverse order, to detect objects within the images. A set of undetected object image(s) 206 may be determined by the object detector 204 as not detecting an object before the object is detected in a first detected object image 208. In some examples, the object detector 204 detects an object for the first time in the image sequence 202 in a detected object image 208 (e.g., the image 306 of FIG. 3A). In such an example, the images in the image sequence 202 before the detected object image 208 may have led to no object detections, and thus may be classified as undetected object image(s) 206 (e.g., the images 302 and 304 of FIG. 3A).

Once an object is detected in the detected object image 208, object tracking 134 may be performed on the undetected object image(s) 206 (e.g., images 302 and 304 of FIG. 3A), leveraging the object detection of the detected object image 208, to track the object through the undetected object image(s) 206 in the sequence—e.g., forwards or backwards, sequentially through the image sequence 202. For example, if the object detector does not detect an object in any of frames 1-35 of the image sequence 202, but detects an object in frame 36, object tracking 134 may be used to track the object from frame 36, to frame 35, to frame 34, and so on until a first frame of the image sequence 202 that the object was present in. As another example, if the object detector does not detect an object in any of frames 2-35 of the image sequence 202, but detects an object in frame 1, object tracking 134 may be used to track the object from frame 1, to frame 2, to frame 3, and so on until a last frame of the image sequence 202 that the object was present in. In some examples, object tracking 134 may be used to track an object forward and backward in the image sequence 202, such as where the detected object image 208 is between a first image and a last image in the image sequence 202 that includes the object.

Once the object is tracked through each of the images in the image sequence 202 where present, the detected object labels in the detected object image 208 may be leveraged to generate to new object labels (e.g., new ground truth data, where the object detector 204 is a machine learning model) for training, retraining, or updating the programming of the object detector 204.

Figure 2B:
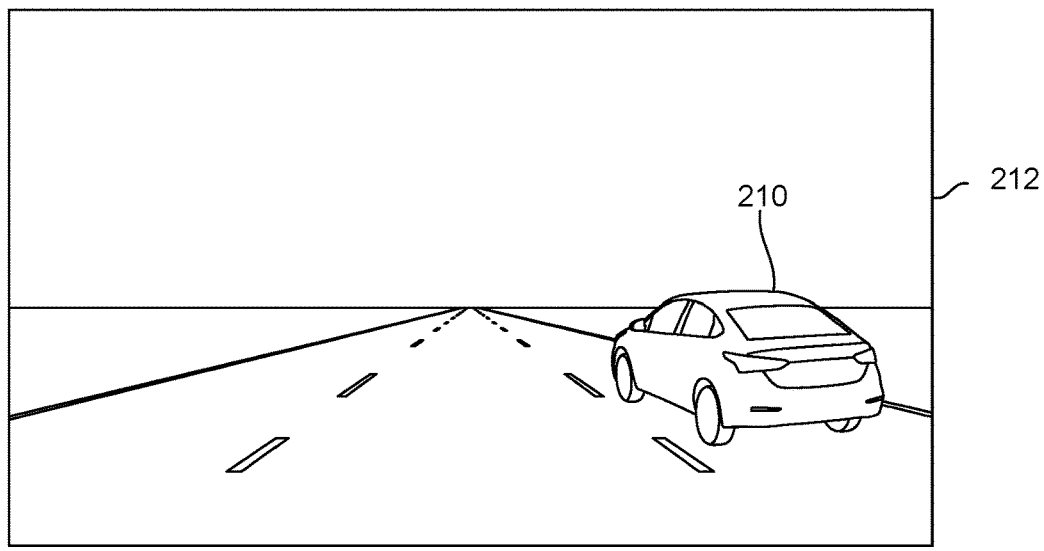
FIG. 2B is an illustration of an example image generated by a forward-facing camera of a vehicle, in accordance with some embodiments of the present disclosure.
Figure 2C:
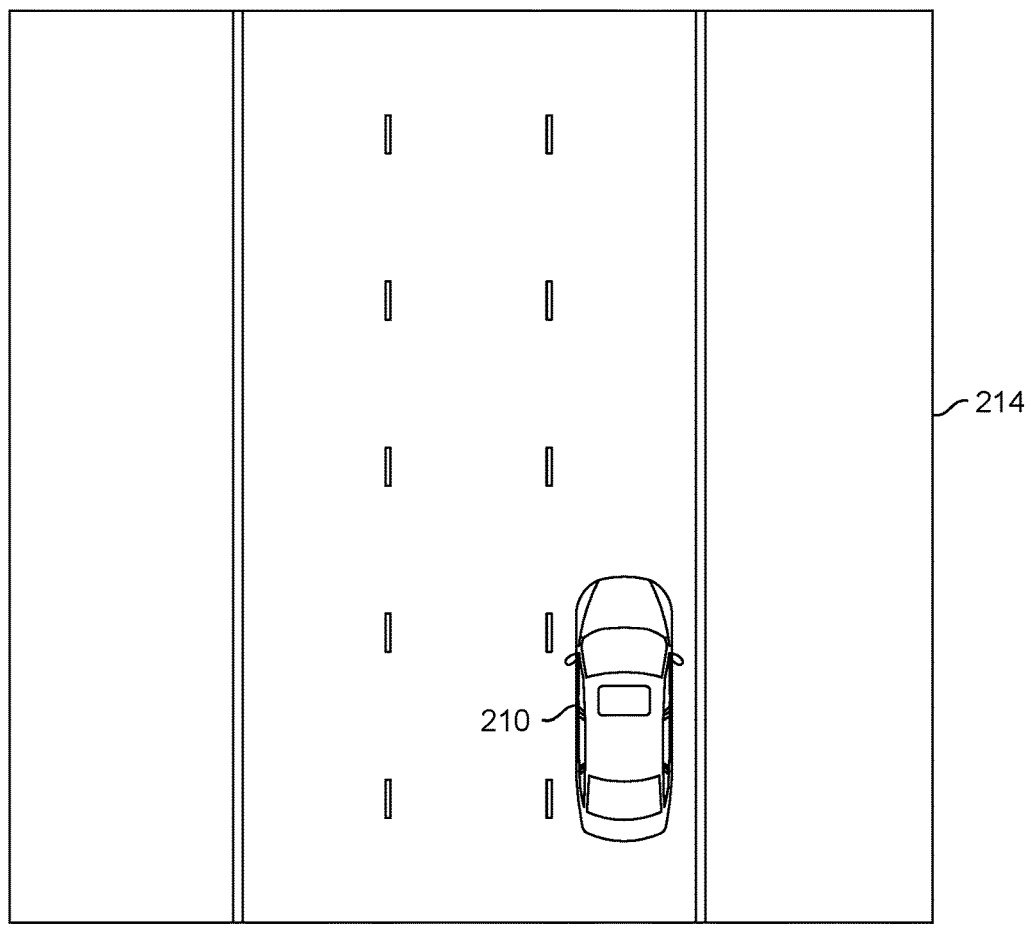
FIG. 2C is an example illustration of an example image generated by a traffic camera mounted on a traffic signal, in accordance with some embodiments of the present disclosure.

Referring now to FIGS. 2B and 2C, FIGS. 2B and 2C are illustrations of example images generated by a camera of a vehicle and a traffic camera mounted on a traffic signal, respectively, in accordance with some embodiments of the present disclosure. At a high level, FIGS. 2B and 2C illustrate the difference in visible and/or recognizable areas of the same vehicle when viewed from different perspectives and/or fields of view. FIG. 2B is an example image 212 of a vehicle 210 generated from, for example, a forward-facing camera positioned or disposed on vehicle. FIG. 2C is an example image 214 of the vehicle 210 generated from, for example, a traffic camera. The back and side of the vehicle 210 may be the visible area of the vehicle 210 in the image 212, whereas the top of the vehicle 210 may be the visible and/or recognizable area of the vehicle 210 in the image 214. As such, when images from one camera at one perspective are used to train or program a machine learning model (e.g., machine learning model(s) 104 of FIGS. 1A-1C) or an object detector (e.g., object detector 204 of FIG. 2A), the model or detector may only detect objects when they are captured from the perspective(s) they are trained using.

Hence, conventional systems require manually generating new ground truth data—without leveraging an already trained model—to train models with an updated set of ground truth data in order to detect objects from different perspectives. For example, a different ground truth data set may be used to train a machine learning model to detect objects in FIG. 2B as would be needed to detect objects in FIG. 2C. A model trained using images similar to image 212 of FIG. 2B may not detect an object in all images of an image data set similar to image 214 of FIG. 2C because a top view of a vehicle may not look similar enough to a side and/or back view of the same vehicle. However, the processes described herein with respect to FIGS. 1A-1C and 2A remedy these drawbacks of conventional systems by automatically generating the new ground truth data from the second, different perspective leveraging the already trained model and using an object tracking algorithm. As such, not only is the ground truth data set automatically generated making the training of the model more robust, by leveraging the detections of the model to automatically generate the ground truth, the new ground truth data may only be generated for perspectives (or sensor data) where the model is currently inaccurate. This allows for automatic ground truth data generation only for sensor data that the model is not accurate in generating predictions for, while saving the compute and processing time of generating and training on ground truth data where the model already succeeds.

It should be noted that the perspectives shown in FIGS. 2B and 2C are used for illustration purposes only, and are not thought to be limiting. As such, the above processes described in relation to FIGS. 1A-1C and 2A may be used similarly for image data from sensors located at any other perspectives, in any other environments, for any other technology as well without departing from the scope of the present disclosure.

Figure 3A:
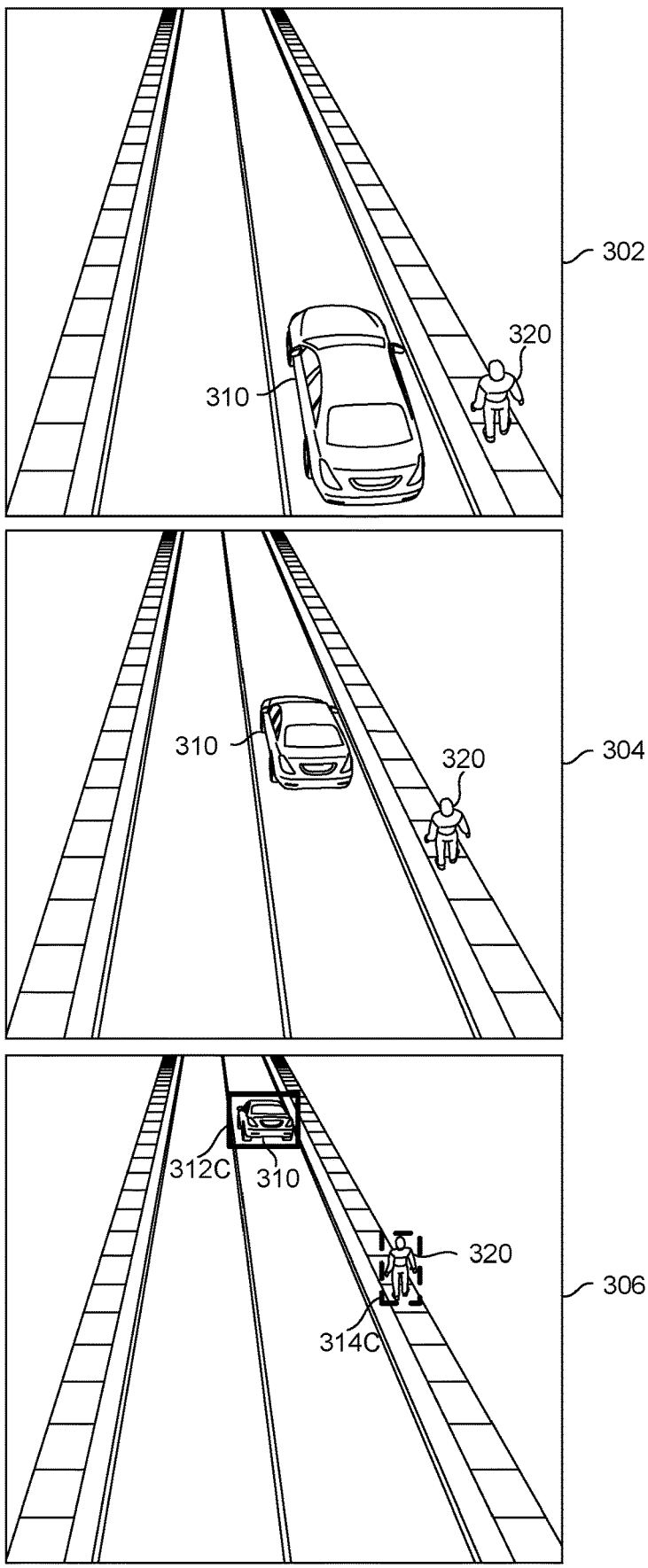
FIG. 3A is an illustration of an example output of a machine learning model trained on images generated from one perspective when applied to images generated from another perspective, in accordance with some embodiments of the present disclosure.
Figure 3B:
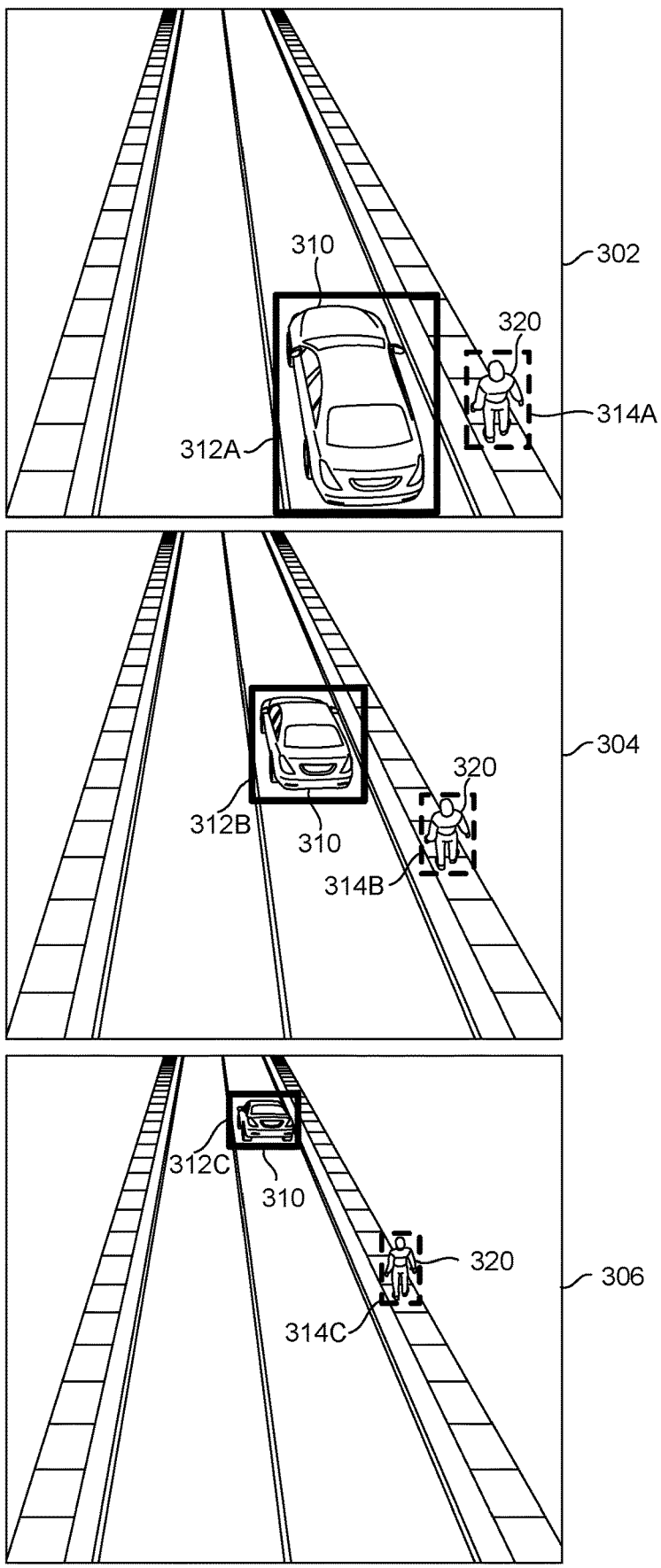
FIG. 3B is an illustration of an example of ground truth automatically generated using object tracking, in accordance with some embodiments of the present disclosure.

Now referring to FIGS. 3A and 3B, FIGS. 3A and 3B illustrate object detections by a machine learning model using sensor data before and after using the object detection process 120 of FIG. 1B, 140 of FIG. 1C or 200 of FIG. 2A, respectively, in accordance with some embodiments of the present disclosure. Specifically, FIG. 3A illustrates an example output of a machine learning model (e.g., machine learning model(s) 104) trained using images from a camera of a vehicle when applied to images from a camera mounted at a different perspective (e.g., a traffic camera, a camera mounted on a building, etc.). As the vehicle 310 moves farther away from the camera mounted at a greater height in the images 302, 304, and 306, more of the back of the vehicle is visible, making the vehicle 310 as shown in the image 306 resemble a vehicle captured by a camera of a vehicle. As such, due to the similarity in the view of the vehicle 310 to images the machine learning model is trained using, the machine learning model may detect the vehicle 310 in the image 306 (e.g., as indicated by the bounding shape 312C. However, the machine learning model may not be able to detect the vehicle 310 in the images 302 and 304 due to the perspective not resembling the perspective of the vehicle images. Similarly, the machine learning model (such as machine learning model(s) 104) may not detect the pedestrian 320 in the images 302 and 304 but may detect the pedestrian 320 in the image 306 (as indicated by the bounding shape 314C).

Additionally, the vehicle 310 and the pedestrian 320 may be classified using a different class label (e.g., vehicle vs. pedestrian). The different class labels may be represented in FIG. 3A by the solid lines for the bounding shape 312C of the vehicle 310 and the dashed lines for the bounding shape 314C of the pedestrian. This is not intended to be limiting, and any visualization of the object detections of the machine learning model(s) may include different shapes, patterns, fills, colors, symbols, and/or other identifiers to illustrate differences in class labels for object in the images.

Referring now to FIG. 3B, FIG. 3B illustrates an example of ground truth data generated using object tracking (e.g., object tracking 134 of FIG. 1B) and label generation (label generation 136 of FIG. 1B), in accordance with some embodiments of the present disclosure. The ground truth data (e.g., the ground truth data 138 of FIG. 1B) generated after object tracking may be illustrated in images 302 and 304. For example, using an object tracking algorithm, the vehicle 310 and/or the pedestrian 320 may be detected and labeled in images 302 and 304 where the objects were not previously detected by the machine learning model. The vehicle 310 and the pedestrian 320 may be tracked in images 302 and 304 of sensor data (e.g., the second sensor data 122) using an object tracking algorithm once the vehicle 310 and the pedestrian 320 are detected in the image 306. Locations of the vehicle 310 and the pedestrian 320 may be tracked—leveraging the predictions of the machine learning model illustrated in the image 306—backward in the sequence of images to locate the vehicle 310 and the pedestrian 320 in the prior images 302 and 304.

Once the vehicle 310 and the pedestrian 320 are detected and located in images 302 and 304, their object labels and/or class labels may be leveraged from the detected object labels and/or class label predicted by the machine learning model for the image 306 to generate respective object and/or class labels for the vehicle 310 and the pedestrian 320 in the images 302 and 304. In some embodiments, the object labels may be adjusted based on the size of the object in each of the images. As illustrated, the bounding shape 312A for the vehicle 310 in the image 302 is larger than the bounding shape 312B generated for vehicle 310 in the image 304, which may correspond to the difference in size or scale of the vehicle in the two images. In addition, in some examples, the class labels for the vehicle 310 and the pedestrian 320 may be carried over as illustrated by the solid lines for the bounding shape 312 of the vehicle 310 and the dashed lines for the bounding shape 314 of the pedestrian 320. The object labels and the class labels associated with each of the images 302, 304, and 306 may be used as ground truth data (e.g., ground truth data 138 of FIG. 1B) to increase the size and robustness of a ground truth data set, to retrain the machine learning model, and/or train a new machine learning model to detect objects in images generated from the traffic camera.

Figure 4:
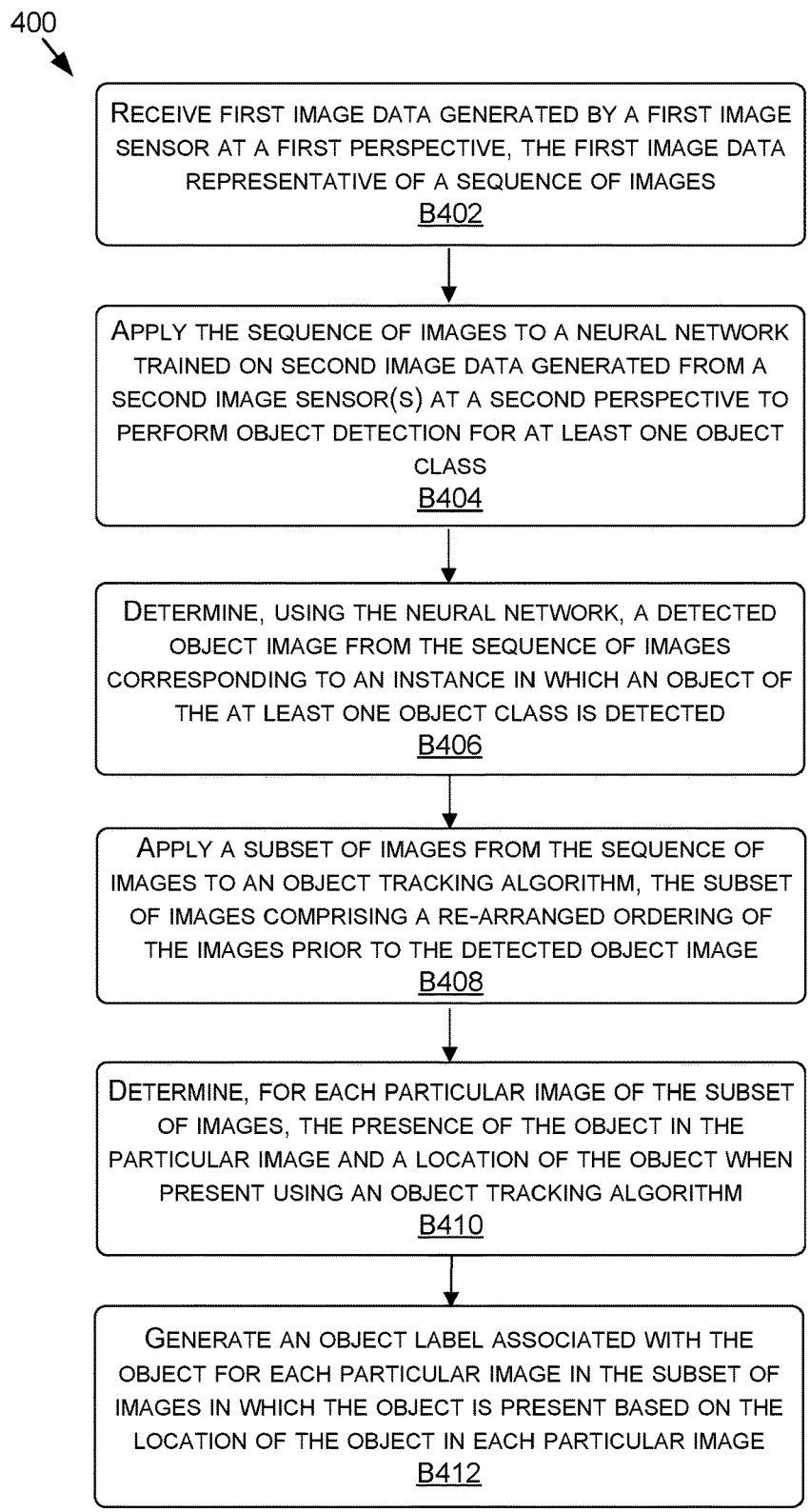
FIG. 4 is a flow diagram illustrating an example method for leveraging a machine learning model to generate ground truth data for training or retraining a machine learning model, in accordance with some embodiments of the present disclosure.
Figure 5:
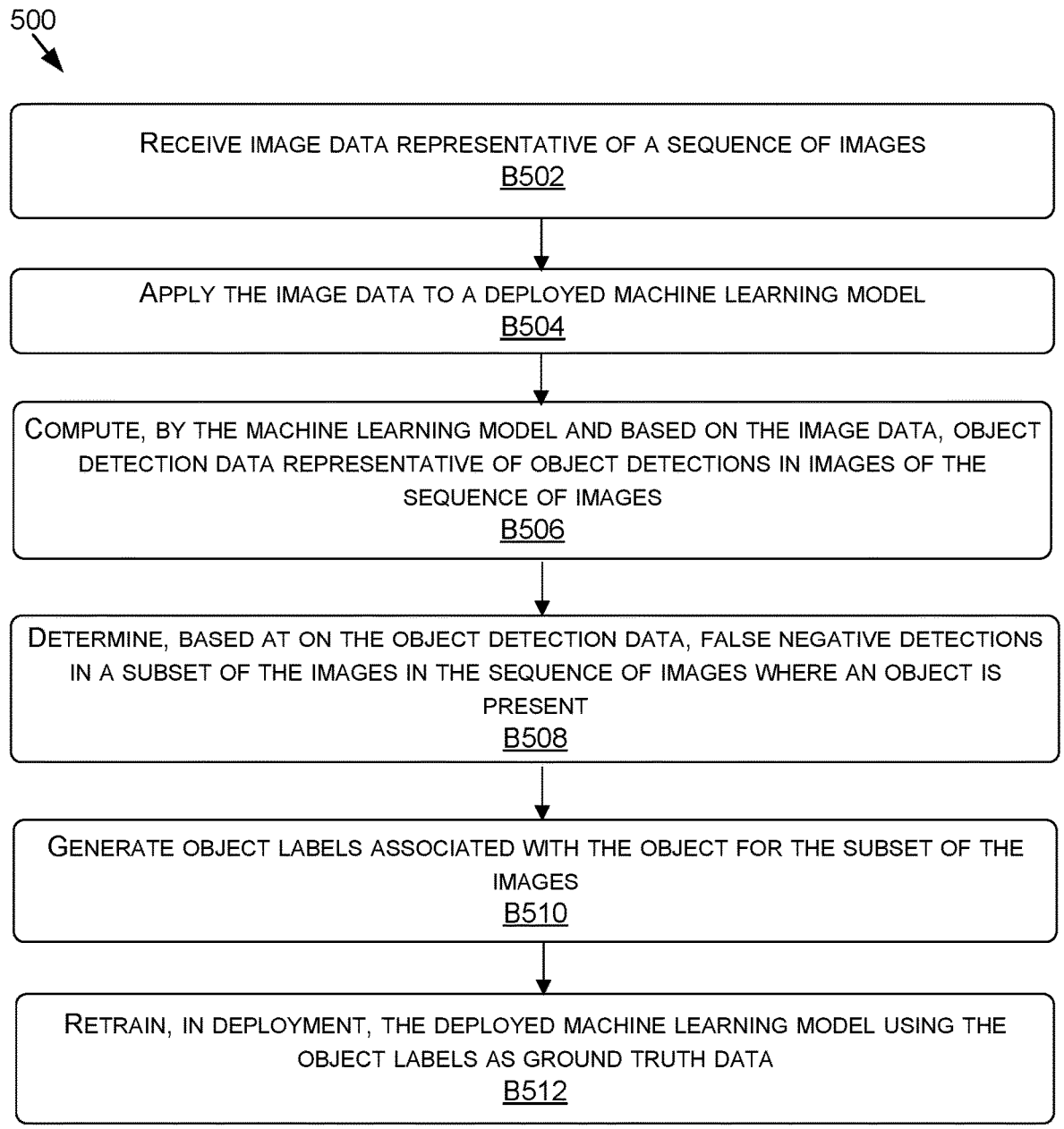
FIG. 5 is a flow diagram illustrating an example method for retraining a deployed machine learning model in deployment, in accordance with some embodiments of the present disclosure.
Figure 6:
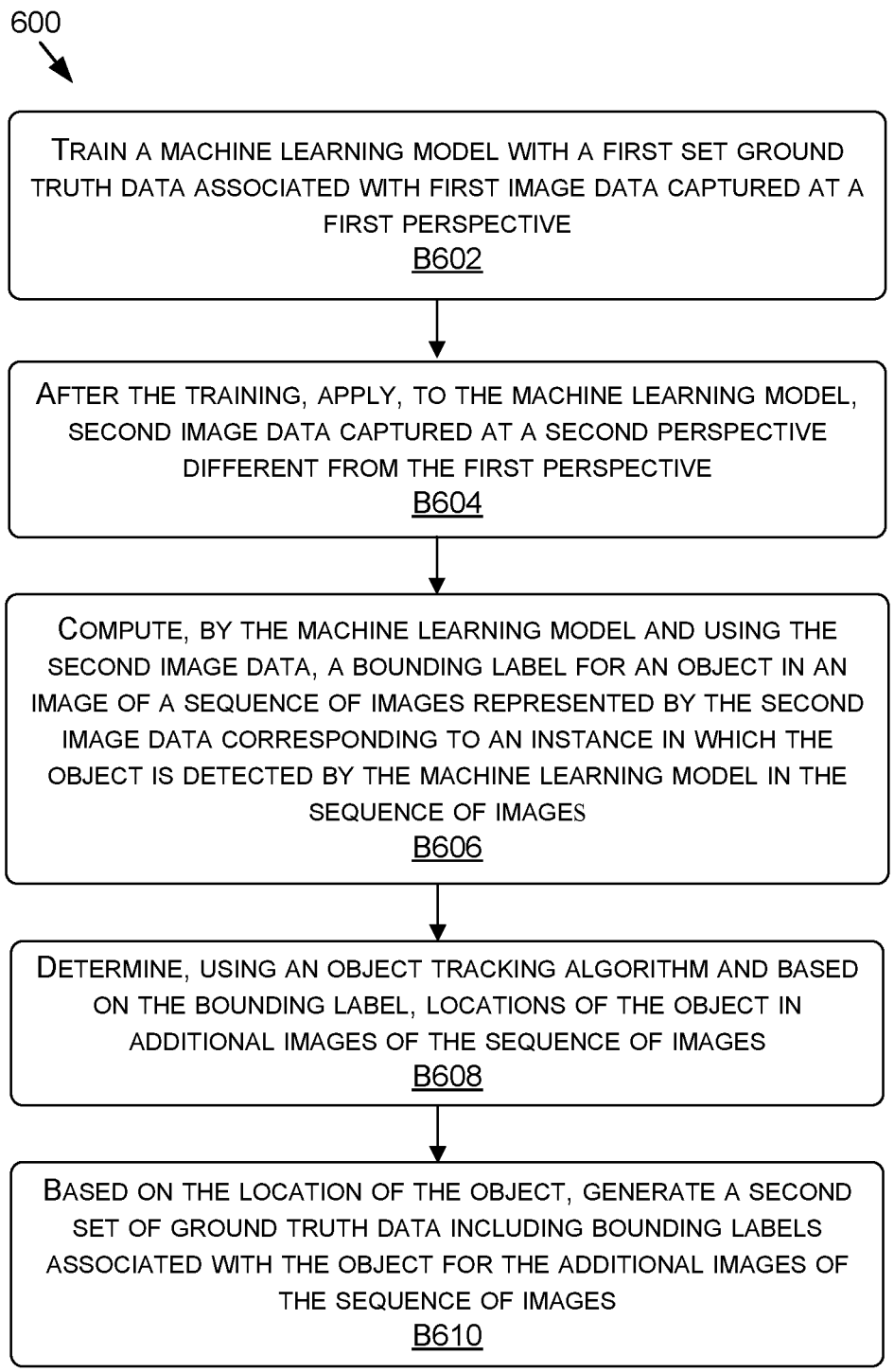
FIG. 6 is a flow diagram illustrating an example method for leveraging a machine learning model to increase robustness of a ground truth training set, in accordance with some embodiments of the present disclosure.

Now referring to FIGS. 4-6, each block of methods 400, 500, and 600, described herein, comprises a computing process that may be performed using any combination of hardware, firmware, and/or software. For instance, various functions may be carried out by a processor executing instructions stored in memory. The methods 400, 500, and 600 may also be embodied as computer-usable instructions stored on computer storage media. The methods 400, 500, and 600 may be provided by a standalone application, a service or hosted service (standalone or in combination with another hosted service), or a plug-in to another product, to name a few. In addition, methods 400, 500, and 600 are described, by way of example, with respect to the process 100 of FIG. 1A, the process 120 of FIG. 1B, the process 140 of FIG. 1C, and/or the process 200 of FIG. 2A. However, these methods 400, 500, and 600 may additionally or alternatively be executed by any one system, or any combination of systems, including, but not limited to, those described herein.

FIG. 4 is a flow diagram illustrating an example method 400 for leveraging a machine learning model to generate ground truth data for training or retraining a machine learning model, in accordance with some embodiments of the present disclosure. The method 400, at block B402, includes receiving first image data generated by a first image sensor at a first perspective, the first image representative of a sequence of images. For example, the second sensor data 122 may be received, where the second sensor data 122 is at a perspective different from the perspective that the machine learning model(s) 104 was trained.

The method 400, at block B404, includes applying the sequence of images to a neural network trained on second image data generated from a second image sensor(s) at a second perspective to perform object detection for at least one object class. For example, images—e.g., a sequence of images—represented by the second sensor data 122 may be applied to the machine learning model(s) 104 for the machine learning model(s) 104 to predict object detections for one or more objects.

The method 400, at block B406, includes determining, using the neural network, an object detected image from the sequence of images corresponding to an instance in which an object of the at least one object class is detected. For example, detection determination 128 may be used to determine a detected object frame 130 in a sequence of images represented by the second sensor data 122.

The method 400, at block B408, includes applying a subset of images from the sequence of images to an object tracking algorithm, the subset of images comprising a re-arranged ordering of the images prior to the object detected image. For example, the subset of images (e.g., undetected object frame(s) 132, undetected object image(s) 206) may include a re-arranged ordering of the images from the sequence of images prior to the first image, and the subset of images in the re-arranged ordering may undergo object tracking 134 to track the object through the subset of images. The re-arranged ordering may include rearranging the images in a reverse or forward ordering, where the images may be rearranged sequentially. In some examples, each image in the sequence may undergo object tracking 134, every other image may undergo object tracking 134, or another interval within the sequence may be used to track the object through at least some of the undetected object frame(s) 132.

The method 400, at block B410, includes determining, for each particular image from the subset of images, the presence of the object in each particular image and a location of the object when present using an object tracking algorithm. The detecting of the object in each particular image may be based at least in part on detecting the object in the first image (e.g., image 306). For example, object tracking 134 can utilized to track the object in undetected object frame(s) 132, and determine the location of the object in the undetected object frame(s) 132.

The method 400, at block B412, includes generating an object label (associated with the object for each the particular image in the subset of images in which the object is present based on the location of the object in each particular image. For example, new object labels 140 associated with the object may be generated using label generation 136 for each particular image in the subset of images in the object is present based on the location of the object in each particular image (e.g., vehicle 310A, vehicle 310B, pedestrian 320A, and pedestrian 320B).

Now referring to FIG. 5, FIG. 5 is a flow diagram illustrating an example method 500 for retraining a deployed machine learning model in deployment, in accordance with some embodiments of the present disclosure. The method 500, at block B502, includes receiving image data representative of a sequence of images. For example, the second sensor data 122 may be received, where the second sensor data 122 is representative of a sequence of images. In such an example, at least some of the sequence of images may depict a same object.

The method 500, at block B504, includes applying the image data to a deployed machine learning model. For example, the second sensor data 122 may be applied to machine learning model(s) 104 while the machine learning model(s) 104 is deployed (e.g., after being trained to detect objects using the sensor data 102 from a first perspective).

The method 500, at block B506, includes computing, by the machine learning model and based on the image data, object detection data representative of object detections in images of the sequence of images. For example, second object detections 104 may be computed by the machine learning model(s) 104 based on the second sensor data 122. The second object detections 122 may be representative of object detections in images of the sequence of images in second image data 122.

The method 500, at block B508, includes determining, based on the object detection data, false negative detections in a subset of the images in the sequence of images where an object is present. For example, detection determination 128 may be used to determine the quality or accuracy of the machine learning model(s) 104 at predicting the second object detections 124 by identifying false negatives in the sequence of images (e.g., in the undetected object frames 132). In some embodiments, the false negative detections may be determined by identifying a presence of the object in an image (e.g., the detected object frame(s) 130) using object detection data generated by the machine learning model(s) 104. In addition, a determination may be made— using the object detection data—that the object is not detected in an adjacent image to the image (e.g., a frame before or after the detected object frame(s) 132, such as immediately preceding or succeeding the detected object frame(s) 132, or within a threshold distance (e.g., 1-3 frames) from the detected object frame(s) 130). Object tracking 134 may be performed on the adjacent image and/or additional images in a sequential order in a direction from the detected object frame(s) 130 toward the adjacent image. From the object tracking information, it may be determined that the object is present in the adjacent image and/or other images. This information may be used to determine the false negative detections by the machine learning model(s) 104.

The method 500, at block B510, includes generating object labels associated with the object for the subset of the images. For example, label generation 136 may be used to generate new object labels 140 associated with the object for at least one of the undetected object frame(s) 132 where the object is detected.

The method 500, at block B512, includes retraining, in deployment, the deployed machine learning model using the object labels as ground truth data. For example, new object labels 140 may be used as ground truth data 138 to retrain the machine learning model(s) 104 while it is deployed (e.g., the machine learning model(s) 104 may be retrained within the system that is using the deployed model).

Now referring to FIG. 6, FIG. 6 is a flow diagram illustrating an example method 600 for leveraging a machine learning model to increase robustness of a ground truth training set, in accordance with some embodiments of the present disclosure. The method 600, at block B602, includes training a machine learning model with a first set of ground truth data associated with first image data captured at a first perspective. For example, the machine learning model(s) 104 may be trained based on ground truth data 110 associated with first sensor data 102 including image data captured at a first perspective.

The method 600, at block B604, includes after the training, applying, to the machine learning model, second image data captured at a second perspective different from the first perspective. For example, after training the machine learning model(s) 104 with first sensor data 102, second sensor data 122 may be applied to the machine learning model(s) 104. The second sensor data 104 may be captured at a second perspective different from the first perspective.

The method 600, at block B606, includes computing, by the machine learning model and using the second image data, a bounding label for an object in an image from a sequence of images represented by the second image data corresponding to an instance in which the object is detected by the machine learning model in the sequence of images. For example, a bounding label may be computed for a vehicle 310C and/or a pedestrian 320C corresponding to an instance 306 in which the vehicle and/or pedestrian is detected by the machine learning model(s) 104 in the sequence of images (e.g., the images 302, 304 and 306).

The method 600, at block B608, includes determining, using an object tracking algorithm and based on the bounding label, locations of the object in additional images of the sequence of images. For example, object tracking 134 may be used to track locations of the object in some of the undetected object frame(s) 132 based on the second object detections 124 in the detected object frame(s) 130.

The method 600, at block B10, includes based on the location of the object, generating a second set of ground truth data including bounding labels associated with the object for the additional images of the sequence of images. For example, label generation 136 may use locations of the object in undetected object frame(s) 132 to generate a ground truth data 138 including bounding labels (e.g., bounding labels for vehicle 310A, 310B and pedestrian 320A, 320B) associated with the object for some of the undetected object frame(s) 132 where the object is detected.

Example Computing Device

Figure 7:
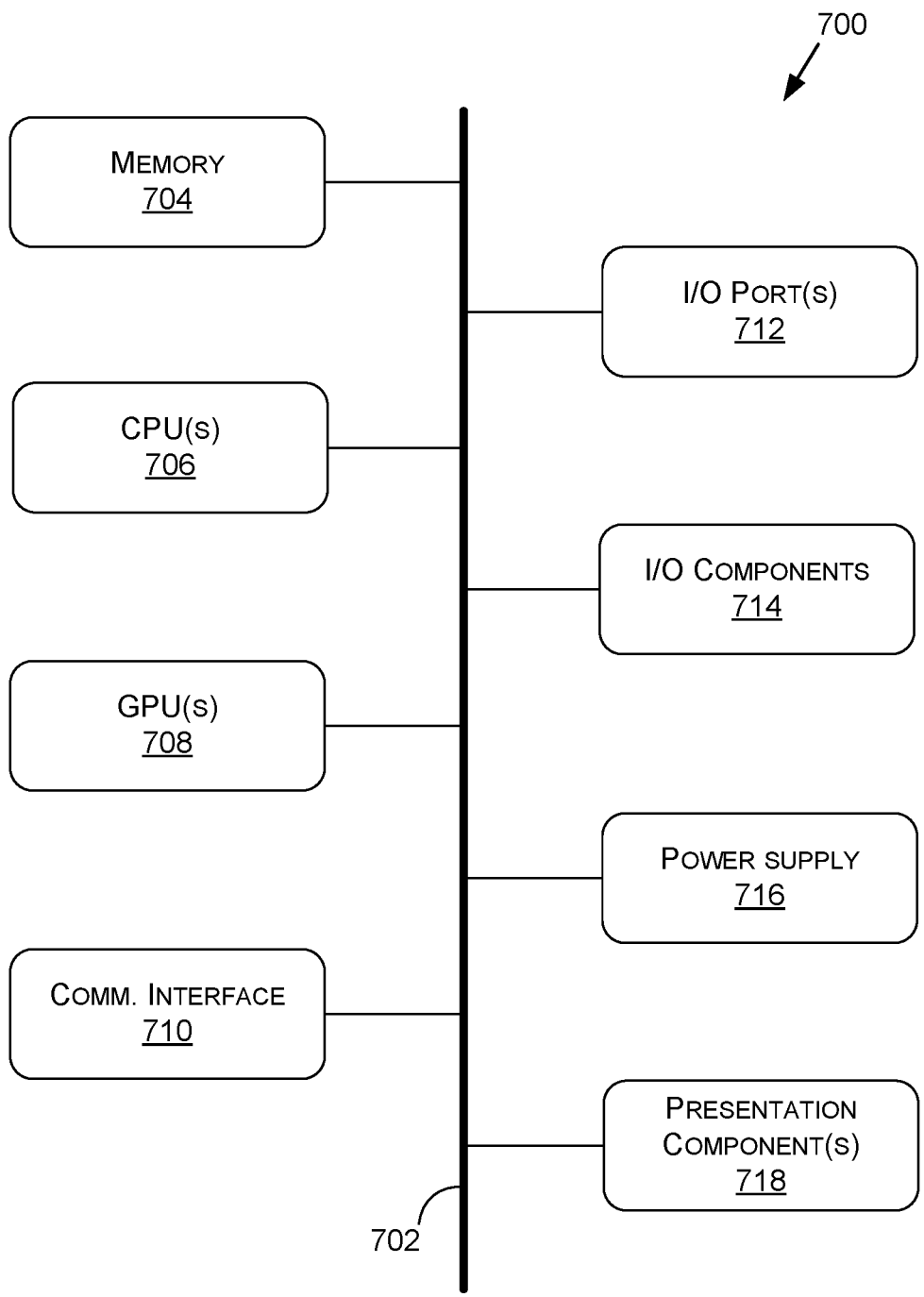
FIG. 7 is an example block diagram for an example computing device suitable for implementation of embodiments of the present disclosure.

FIG. 7 is a block diagram of an example computing device 700 suitable for use in implementing some embodiments of the present disclosure. Computing device 700 may include a bus 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, and one or more presentation components 718 (e.g., display(s)).

Although the various blocks of FIG. 7 are shown as connected via the bus 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "handheld device," "game console," "electronic control unit (ECU)," "virtual reality system," and/or other device or system types, as all are contemplated within the scope of the computing device of FIG. 7.

The bus 702 may represent one or more busses, such as an address bus, a data bus, a control bus, or a combination thereof. The bus 702 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 706 may be configured to execute the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an ARM processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

The GPU(s) 708 may be used by the computing device 700 to render graphics (e.g., 3D graphics), perform model training or retraining, generate new ground truth data, encode ground truth data and/or decode model outputs, and/or to perform other operations. The GPU(s) 708 may include hundreds or thousands of cores that are capable of handling hundreds or thousands of software threads simultaneously (e.g., via parallel processing, GPU acceleration, and/or the like, such as using NVIDIA's CUDA). The GPU(s) 708 may generate pixel data for output images in response to rendering commands (e.g., rendering commands from the CPU(s) 706 received via a host interface). The GPU(s) 708 may include graphics memory, such as display memory, for storing pixel data. The display memory may be included as part of the memory 704. The GPU(s) 708 may include two or more GPUs operating in parallel (e.g., via a link). When combined together, each GPU 708 may generate pixel data for different portions of an output image or for different output images (e.g., a first GPU for a first image and a second GPU for a second image). Each GPU may include its own memory, or may share memory with other GPUs.

In examples where the computing device 700 does not include the GPU(s) 708, the CPU(s) 706 may be used to render graphics and/or to perform one or more of the methods and/or processed described herein.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    applying a sequence of images to one or more machine learning models (MLMs) trained to generate predictions corresponding to object detection for at least one object class;
    detecting, using one or more of the predictions, an object corresponding to the at least one object class in at least one image of the sequence of images;
    tracking the object from the at least one image through one or more other images from the sequence of images to determine a presence of the object in the one or more other images; and
    automatically associating at least one object label associated with the object with the one or more other images based at least on the determining of the presence of the object in the one or more other images, wherein one or more predictions corresponding to object detection generated using the one or more MLMs are used to perform one or more operations for at least one or more of:
    an augmented reality application, a virtual reality application, a robotics application, a security and surveillance application, a character recognition application, a medical imaging application, a simulation application, a synthetic data generation application, or an autonomous machine application.

2. The method of claim 1, further comprising selecting at least an image of the one or more other images for the tracking based at least on the image comprising a false negative detection of the object by the one or more MLMs.

3. The method of claim 1, wherein the tracking the object from the at least one image through the one or more other images is in a reverse ordering of the one or more other images in the sequence of images.

4. The method of claim 1, comprising re-arranging an ordering of the one or more other images in the sequence of images, wherein the tracking of the object is through the re-arranged ordering of the one or more other images.

5. The method of claim 1, further comprising updating one or more parameters of at least one of the one or more MLMs or at least one other MLM using the at least one object label as ground truth data.

6. The method of claim 1, wherein the sequence of images is generated using at least one first image sensor having at least one first perspective, and the one or more MLMs were trained on images generated using at least one second image sensor having at least one second perspective different from the at least one first perspective.

7. The method of claim 1, wherein the tracking includes using one or more bounding labels for the object in the at least one image to determine the presence of the object in the one or more other images.

8. The method of claim 1, wherein the tracking includes using one or more locations of the object in the at least one image to determine a location of the object in at least an image of the one or more other images.

9. The method of claim 1, further comprising deploying at least one other MLM trained using the at least one object label, wherein a plurality of object detections made using the at least one other MLM are used to perform the one or more operations for the at least one of:
    the augmented reality application, the virtual reality application, the robotics application, the security and surveillance application, the character recognition application, the medical imaging application, the simulation application, the synthetic data generation application, or the autonomous machine application.

10. A system comprising:
    one or more processing units to execute operations comprising:
        applying image data to one or more machine learning models (MLMs);
        detecting, using the one or more MLMs, an object in one or more first images from a set of images represented by the image data;
        tracking the object from the one or more first images through one or more second images from the set of images to detect the object in the one or more second images; and
        generating ground truth data associating the object with the one or more second images based at least on the detecting of the object in the one or more second images, wherein one or more predictions corresponding to object detection generated using the one or more MLMs are used to perform one or more operations for at least one or more of:
        an augmented reality application, a virtual reality application, a robotics application, a security and surveillance application, a character recognition application, a medical imaging application, a simulation application, a synthetic data generation application, or an autonomous machine application.

11. The system of claim 10, wherein the operations further comprise selecting at least one image of the one or more second images for the tracking of the object based at least on each image of the at least one image comprising a false negative detection of the object by the one or more MLMs.

12. The system of claim 10, wherein the tracking includes using one or more bounding shapes for the object in the one or more first images to determine a presence of the object in the one or more second images.

13. The system of claim 10, wherein the tracking of the object is through a plurality of the one or more second images in a re-arranged ordering relative to an order in which the set of images is applied to the one or more MLMs.

14. The system of claim 10, wherein the set of images is generated using at least one first image sensor having at least one first perspective, and the one or more MLMs were trained on images generated using at least one second image sensor having at least one second perspective different from the at least one first perspective.

15. The system of claim 10, wherein the operations further comprise deploying at least one other MLM trained using the ground truth data, wherein a plurality of object detections made using the at least one other MLM are used to perform the one or more operations for the at least one of:
the augmented reality application, the virtual reality application, the robotics application, the security and surveillance application, the character recognition application, the medical imaging application, the simulation application, the synthetic data generation application, or the autonomous machine application.

16. A processor comprising:
one or more circuits to track an object through one or more first images from a set of images applied to one or more machine learning models (MLMs) using one or more second images from the set of images based at least on the one or more MLMs indicating a presence of the object in the one or more second images, and to generate one or more labels for the one or more first images based at least on the tracking of the object through the one or more second images, wherein one or more predictions corresponding to object detection generated using the one or more MLMs are used to perform one or more operations for at least one or more of:
an augmented reality application, a virtual reality application, a robotics application, a security and surveillance application, a character recognition application, a medical imaging application, a simulation application, a synthetic data generation application, or an autonomous machine application.

17. The processor of claim 16, wherein the one or more circuits are further to select at least one image of the one or more first images for the detecting of the object based at least on each image of the at least one image comprising a false negative detection of the object by the one or more MLMs.

18. The processor of claim 16, wherein the tracking includes using one or more bounding shapes for the object in the one or more second images to determine a presence of the object in the one or more first images.

19. The processor of claim 16, wherein the tracking of the object is through a plurality of the one or more first images in a re-arranged ordering relative to an order the set of images is applied to the one or more MLMs.

20. The processor of claim 16, wherein the one or more circuits are further to deploy at least one other MLM trained using the at least one object label, wherein a plurality of object detections made using the at least one other MLM are used to perform the one or more operations for the at least one of:
the augmented reality application, the virtual reality application, the robotics application, the security and surveillance application, the character recognition application, the medical imaging application, the simulation application, the synthetic data generation application, or the autonomous machine application.

* * * * *